United States Patent
Burns et al.

[11] Patent Number: 5,674,129
[45] Date of Patent: Oct. 7, 1997

[54] ADJUSTABLE SHIELD FOR POWER TAKE-OFF SHAFT

[75] Inventors: Stephen E. Burns, Mazon; Carlos T. San Luis, Villa Park, both of Ill.

[73] Assignee: Case Corporation, Racine, Wis.

[21] Appl. No.: 490,102

[22] Filed: Jun. 9, 1995

[51] Int. Cl.⁶ .................................................. F16D 3/84
[52] U.S. Cl. ........................ 464/176; 74/608; 74/609
[58] Field of Search .......................... 464/171, 176, 464/170; 74/608, 609, 15.6; 180/53.1; 280/240

[56] References Cited

U.S. PATENT DOCUMENTS

| | | | |
|---|---|---|---|
| 2,858,680 | 11/1958 | Harrington | 64/3 |
| 3,389,763 | 6/1968 | Meinert | 74/608 |
| 3,504,508 | 4/1970 | Bornzin | 64/3 |
| 3,733,854 | 5/1973 | Young et al. | 64/32 |
| 4,008,583 | 2/1977 | Davis | 64/32 R |
| 4,432,742 | 2/1984 | Hartman | 464/176 |
| 4,553,950 | 11/1985 | Teich | 464/176 |
| 4,665,768 | 5/1987 | Rashkovshy | 74/609 |
| 4,761,152 | 8/1988 | Wagenbach, Jr. | 464/176 |
| 4,840,604 | 6/1989 | Nusbaum et al. | 464/176 |
| 4,840,640 | 6/1989 | Nusbaum et al. | 74/609 X |

FOREIGN PATENT DOCUMENTS 132970  11/1946  Australia .................... 464/176

*Primary Examiner*—Daniel P. Stodola
*Assistant Examiner*—Eileen A. Dunn
*Attorney, Agent, or Firm*—Rudnick & Wolfe

[57] ABSTRACT

A shield assembly for a power take-off shaft protruding from a tractor has first and second generally vertical, laterally spaced side plates adapted to be positioned on opposite lateral sides of the shaft. A cover extends between the side plates and is adapted to be positioned above the shaft. The cover is pivotable about a horizontal pivot axis and movable in a generally linear direction between a first pivoting position and a second linearly displaced pivoting position. A positioning member is disposed on one of the cover and the first side plate, and first and second stops are disposed on the other of the cover and the first side plate. The first stop and positioning member are spaced approximately the same radial distance from the horizontal pivot axis when the cover is in the first pivoting position, and the second stop and positioning member being spaced approximately the same radial distance from the horizontal pivot axis when the cover is in the second linearly displaced pivoting position. The first stop is positioned at a different elevation relative to the second stop so that a first tilt position of the cover is at a different angle than a second tilt position of the cover.

36 Claims, 5 Drawing Sheets

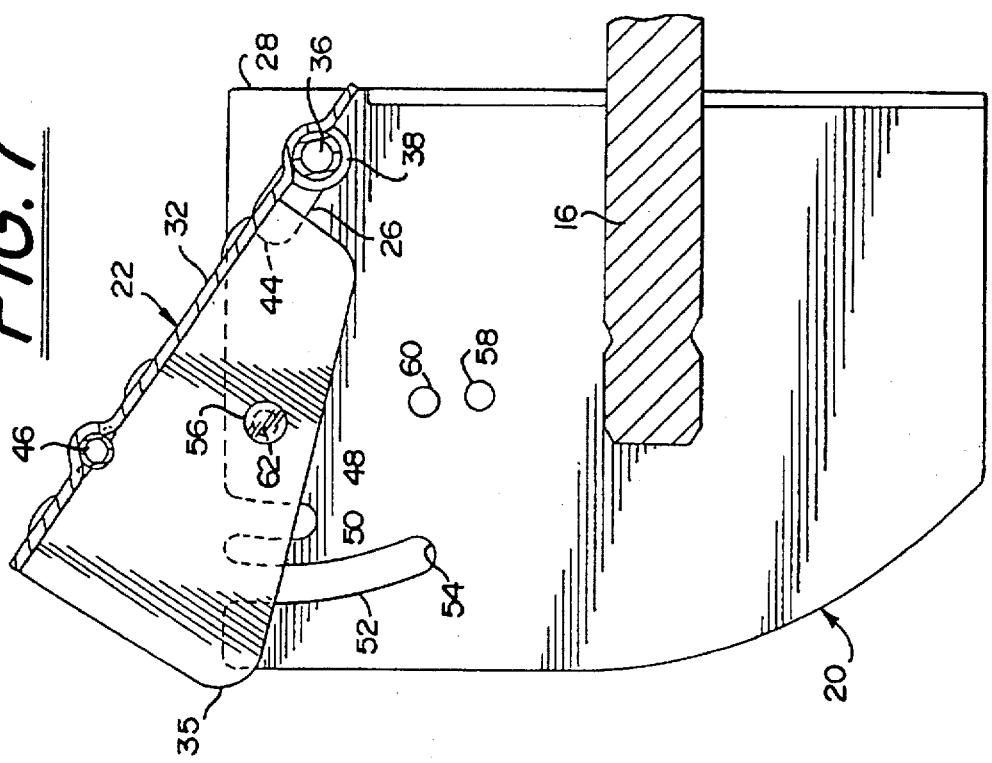
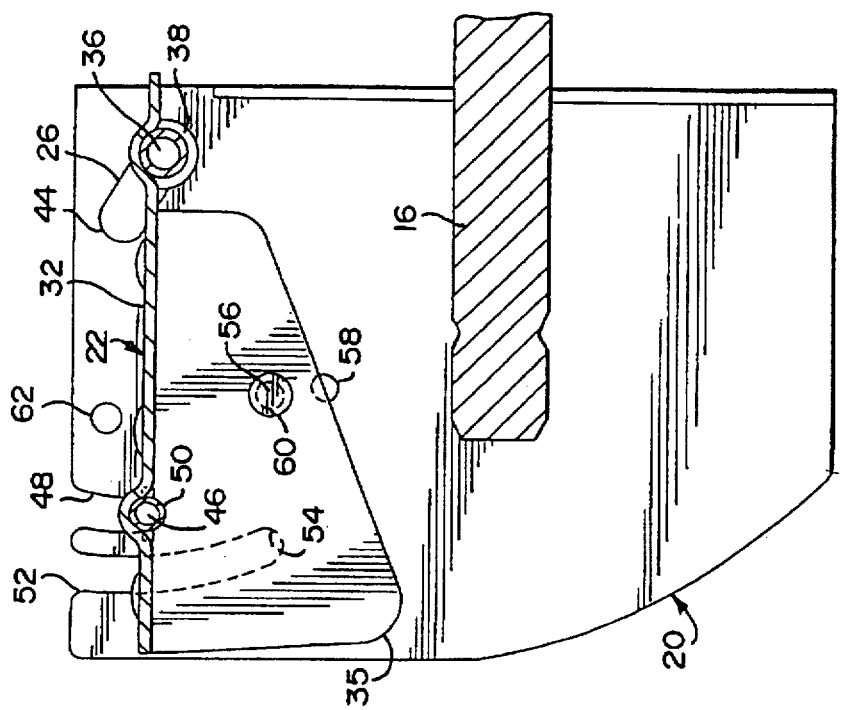

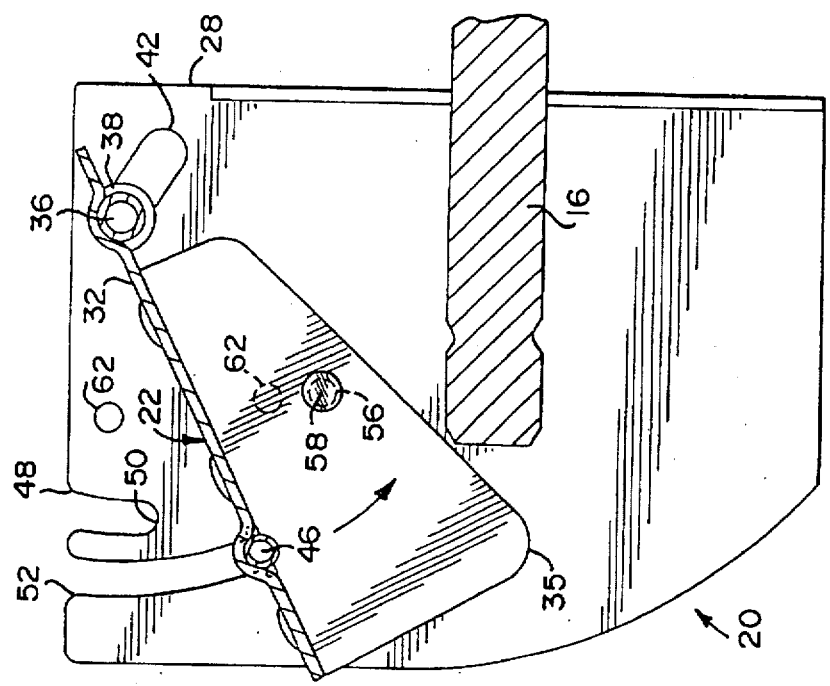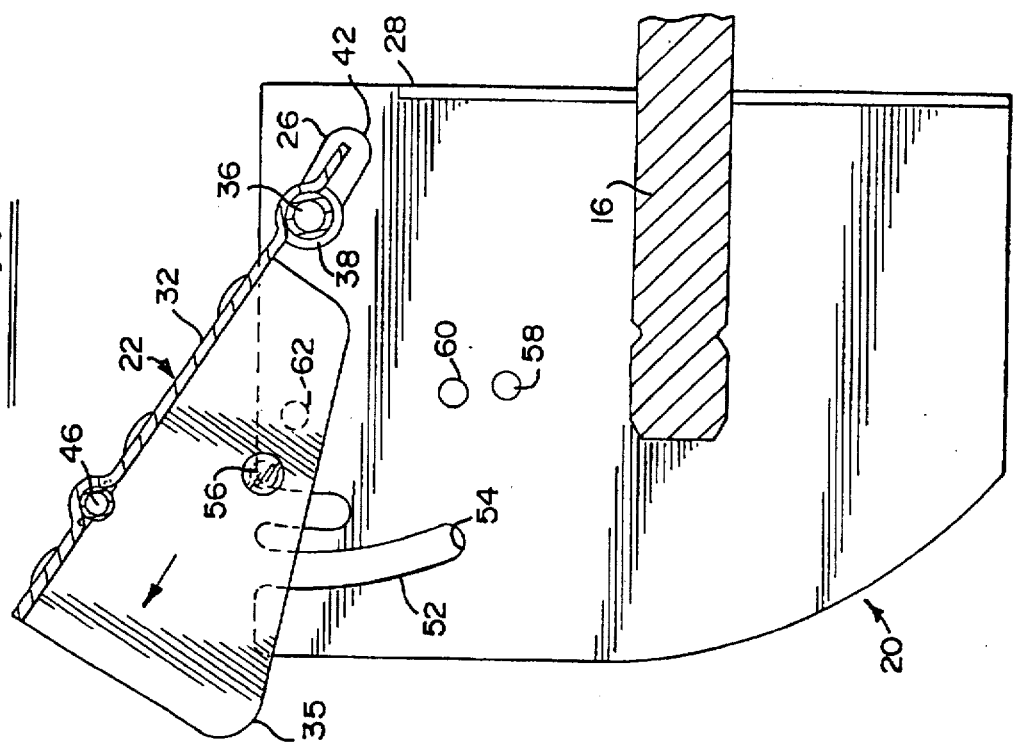

ADJUSTABLE SHIELD FOR POWER TAKE-OFF SHAFT

FIELD OF THE INVENTION

The present invention relates generally to shields for rotating shafts on tractors, and more particularly, to adjustable shields for tractor power take-off shafts.

BACKGROUND OF THE INVENTION

Farm tractors typically include a power take-off (PTO) shaft extending rearwardly from a vertical wall of the tractor. The PTO shaft provides power to the drive shaft of a trailing implement which is usually coupled to the PTO shaft by a universal joint. In such tractors, it is customary to provide a safety shield overlying the top and sides of the PTO shaft to protect the operator from inadvertent contact with the rotating shaft.

While such shields serve the intended function, they tend to make the PTO shaft less accessible during attachment and detachment of the trailing implement drive shaft. In addition, the size of the implement coupling may be limited by the dimensions of the shield. In order to overcome these difficulties, a variety of approaches have been used to provide shields which allow greater access to the PTO shaft. One such approach was to simply make the shield or a top plate thereof completely detachable. However, operators tended to remove the shields permanently because they were "in the way," thus leaving the PTO shaft unprotected. A more recent approach is to provide shields which cannot be completely removed but which are adjustable to a raised position. Typically, such shields include an inverted U-shaped shield which is pivotally mounted on the tractor and normally assumes a PTO shaft protecting position. The shield can be pivoted upwardly and engaged in a position in which it leaves the PTO shaft exposed for easy coupling of an implement drive shaft. Once the drive shaft is attached, the shield is pivoted to its original protective position. One variation of this type of shield is to provide a top plate which is independently pivotable between the raised and protecting position.

One disadvantage of these prior art shields is that adjustment of the shields may be somewhat inconvenient, and in some cases requiring tools which may not be at hand. Thus, there remains the need to provide a PTO shield which can be easily and quickly adjusted between a protective position overlying the PTO shaft and a raised position for providing greater access to the PTO shaft.

Many tractors are also equipped with a 3-point trailer hitch positioned above the PTO shaft for connection to a linkage of the trailing implement. The hitch is often secured for vertical pivotable adjustment to accommodate the height of the particular trailing implement. However, the range of vertical movement of the hitch, and consequently the lead-in angle of the implement linkage, may be limited by the position of the PTO shield. Attempts have been made to allow pivotal movement of the shield to a lowered position in order to accommodate connection of the implement link to the hitch. However, the adjustment of such shields tends to be inconvenient for operators. Thus, it is desirable to provide a PTO shield which can be easily and quickly adjusted to a lowered position to accommodate the requirements of the tractor hitch.

Some other prior PTO shaft shields are lacking in sturdiness and stability in their various positions, which can cause inadvertent dislodgement of the shield and/or lead to improper operation such as binding during adjustment. Some may also have a top plate which tends to rattle excessively during tractor usage. Thus, it is also desirable to provide a PTO shield which can be securely retained in the various positions.

Shields for power take-off shafts are, of course, safety features. If they operate improperly or are considered a nuisance or inconvenient, then they will fail in their primary function because frustrated operators may remove the shield altogether. While there have been many improvements and variations, a need for significant improvements in PTO shaft shields remains.

SUMMARY OF THE INVENTION

In view of the above, and in accordance with one aspect of the present invention, there is provided a shield assembly for a tractor PTO shaft. The shield assembly includes first and second generally vertical, laterally spaced side plates adapted to be positioned on opposite lateral sides of the shaft. A cover extends between the side plates and is adapted to be positioned above the shaft. The cover is pivotable about a horizontal pivot axis and movable in a generally linear direction between a first pivoting position and a second linearly displaced pivoting position. A positioning member is disposed on one of the cover and the first side plate, and first and second stops are disposed on the other of the cover and the first side plate. When the cover is in the first pivoting position, the first stop and positioning member are spaced approximately the same radial distance from the horizontal pivot axis. When the cover is in the second linearly displaced pivoting position, the second stop and positioning member are spaced approximately the same radial distance from the horizontal pivot axis. The first stop is positioned at a different elevation relative to the second stop so that a first tilt position of the cover is at a different angle than a second tilt position of the cover. Thus, when the cover is in the first pivoting position, it is pivotable from the first tilt position in which the positioning member and first stop are in operable engagement, to a raised position in which the positioning member is disengaged from the first stop. The cover is then movable in the linear direction to the second linearly displaced pivoting position to place the positioning member and the second stop along the same arc of pivotal movement. When in the second pivoting position, the cover is pivotable to the second tilt position in which the positioning member and second stop are in operable engagement.

Another aspect of the present invention is to provide a cover which extends between the side plates and has a width less than the distance between the side plates to allow movement of the cover in a lateral direction between the side plates. A biasing member is adapted to act against the cover to force the cover toward the second side plate to inhibit rattling of the cover when the tractor is moving.

Yet another aspect of the invention is to provide a cover which extends between the side plates and is pivotally movable relative to the side plates between at least two different angular displaced positions relative to the shaft. A spring-biased locking mechanism is provided to releasably hold the cover in either of the two different angular displaced positions relative to said shaft.

In one form of the invention, the horizontal pivot axis is defined by a horizontal pivot rod mounted to the cover. The pivot rod has opposing end portions which extend laterally through a pair of aligned, elongated pivot slots formed on the respective side plates. Thus, the cover is pivotable about the axis of the pivot rod and movable in the linear direction defined by the elongated pivot slots. Preferably, the elongated pivot slots angle upwardly from rear edges of the side plates toward top edges of the side plates.

The positioning member is preferably configured as a locating pin rigidly secured to the cover and extending laterally outwardly therefrom. Also preferably, the first stop is defined by a lower edge of a generally upright first guide slot formed in the first side plate. Likewise, the second stop is defined by a lower edge of a generally upright second guide slot formed in the first side plate. The first and second guide slots are spaced apart, and each of the guide slots has a radius of curvature corresponding to the distance from the pivot rod when the cover is in the respective first and second pivoting positions. In addition, the lower edge of the first guide slot is at a higher elevation than the lower edge of the second guide slot. Preferably, the cover is generally horizontal in the first tilt position when the locating pin engages the first guide slot lower edge, and the cover is lowered in the second tilt position when the locating pin engages the second guide slot lower edge. To allow the cover to be raised a desired amount above the side plates, the first and second guide slots are preferably open to the top edge of the side plate to allow complete disengagement of the locating pin therefrom.

In a preferred embodiment, the cover includes a top plate and first and second side flanges depending downwardly therefrom. The first side flange is adjacent the first side plate and the second side flange is adjacent the second side plate. The locking mechanism preferably includes a locking pin extending outwardly from the second side flange toward the second side plate. The second side flange has first, second, and third apertures formed thereon for selectively receiving the locking pin when the cover is in corresponding lowered, horizontal, and raised positions. In order to releasably secure the locking pin in a desired aperture, the cover has a width less than the distance between the side plates, and a compression spring is interposed between the first side plate and the first side flange. Thus, the cover is movable away from the first side plate against the action of the spring to disengage the locking pin and allow pivotal movement the cover. The cover is then pivoted to a desired one of the lowered, horizontal, and raised tilt positions to align the locking pin with the associated one of the first, second, and third apertures. The cover is then released, thereby locking the cover in the selected tilt position.

The present invention provides significant advantages over other PTO shaft shield assemblies. The elongated pivot slots allow the pivot axis of the cover to move in a generally linear direction, thus placing the locating pin along the same arc of pivotal movement as a desired one of the guide slots. This allows a quick and easy way to adjust the tilt position of the cover by simple manipulation of the cover itself, without having to manually adjust other components such as cam followers, adjusting pins, screws, or the like. In addition, the action of the spring inhibits rattling of the cover, and the locking pin/aperture combination provides a simple, efficient way to securely maintain the cover in the lowered, horizontal, and raised tilt positions.

The present invention, together with further objects and advantages, will be best understood by reference to the following detailed description taken in conjunction with the accompanying drawings.

BRIEF DESCRIPTION OF THE DRAWINGS

FIG. 6 is a cross-sectional view of the shield assembly taken along the line 6—6 in FIG. 2 and showing the cover in a horizontal tilt position.

FIG. 7 is a cross-sectional view of the shield assembly showing the cover in a raised tilt position.

FIG. 8 is a cross-sectional view of the shield assembly showing the cover in a linearly displaced raised pivoting position.

FIG. 9 is a cross-sectional view of the shield assembly showing the cover in a lowered tilt position.

DETAILED DESCRIPTION OF THE PREFERRED EMBODIMENT

Figure 1:
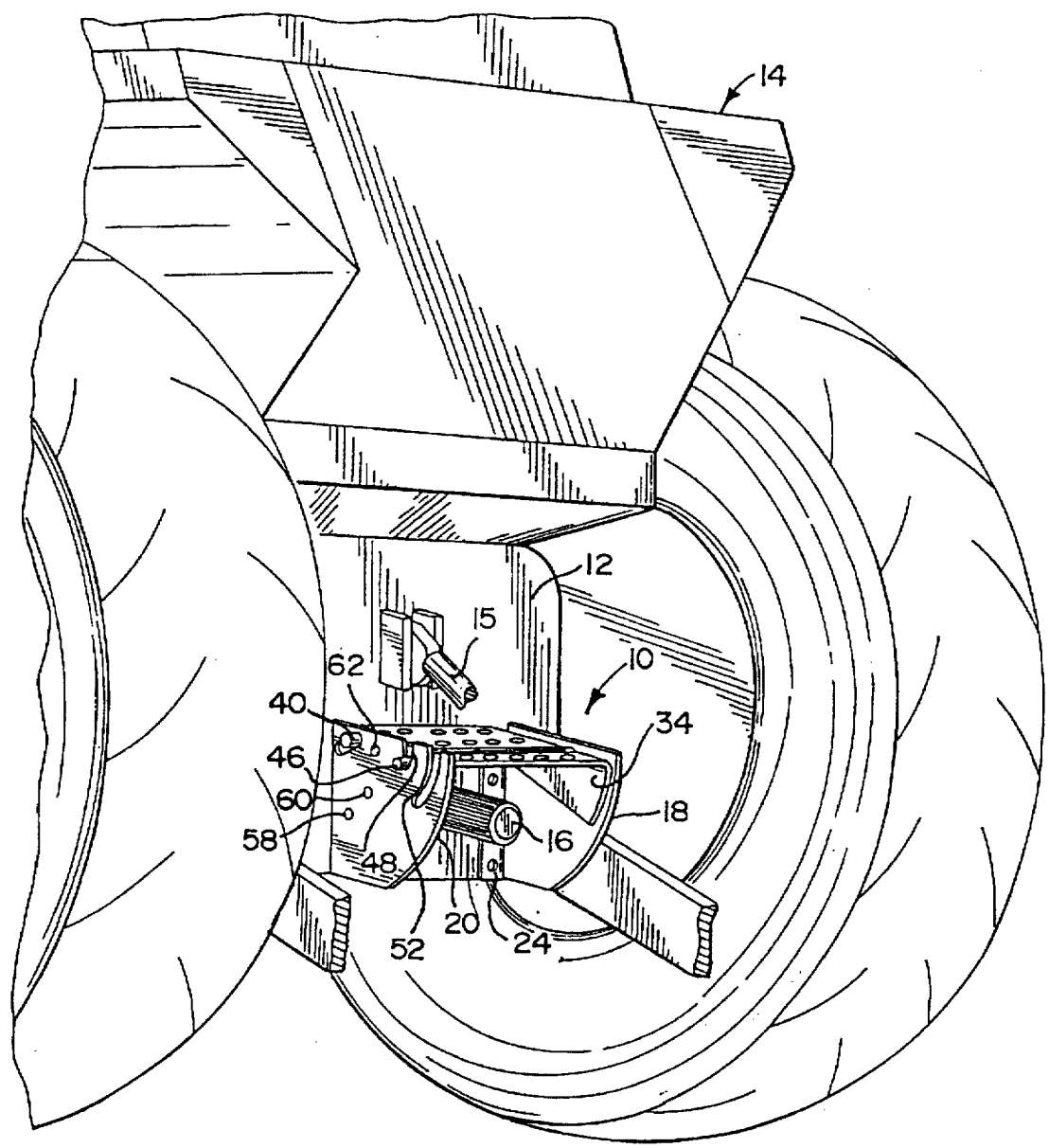
FIG. 1 is a fragmentary perspective view of the rear end of a tractor having a power take-off shield assembly in accordance with the present invention.
Figure 2:
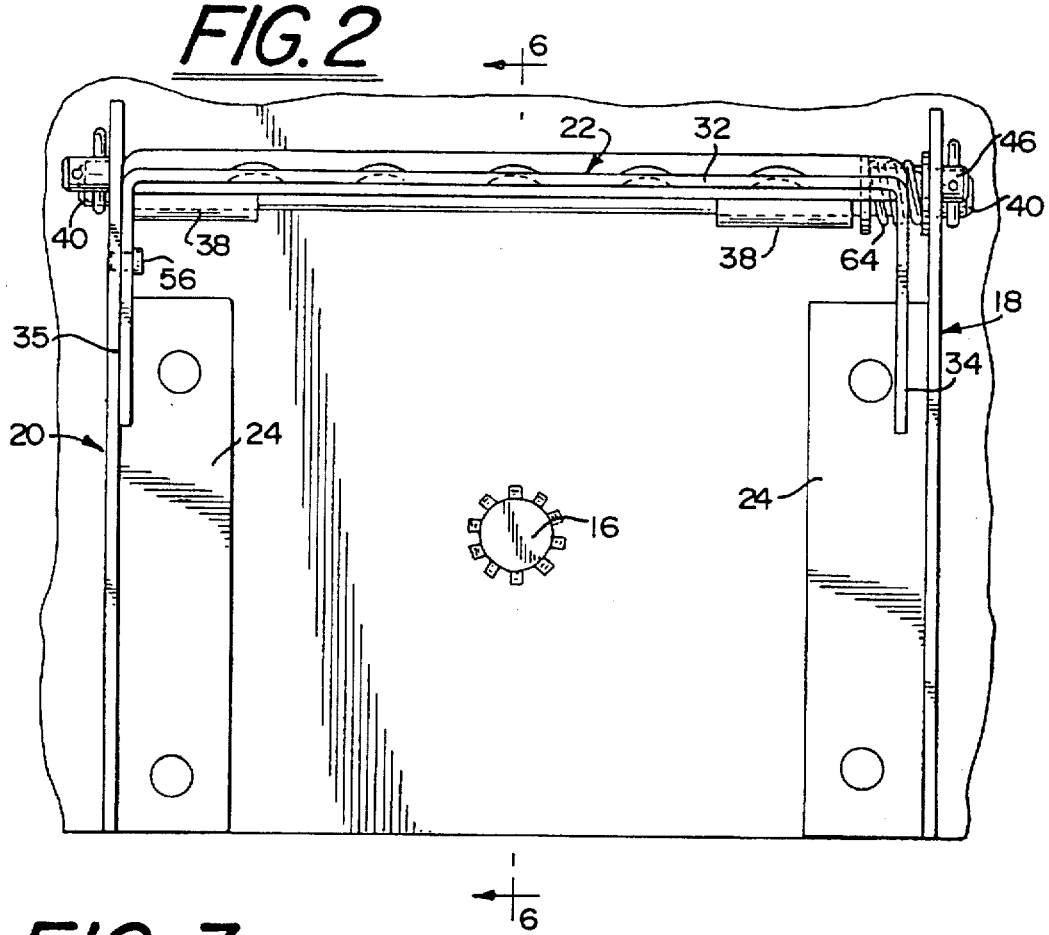
FIG. 2 is a front elevation view of the shield assembly and the power take-off shaft.

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Referring now to the drawings, wherein like reference numerals refer to like parts throughout the several views, there is shown in FIG. 1 a PTO shaft shield assembly 10 attached to a vertical wall 12 of a tractor 14. In the description of the shield assembly 10 below, the front of the shield assembly will be defined as the portion closest to a person standing in front of the shield assembly, and the rear will be defined as the portion attached to the vertical wall 12 of the tractor 14. The shield assembly 10 surrounds a PTO shaft 16 which protrudes horizontally in a fore-aft direction from the vertical wall 12. A pivotal hitch member 15 also protrudes from the vertical wall 12 immediately above the shield assembly 10. It will be appreciated that some tractors have a single PTO shaft, while others have a pair of PTO shafts in vertical alignment. The shield assembly of this invention may be used in either situation.

The shield assembly 10 includes a pair of generally vertical, parallel, spaced side plates 18, 20 positioned on opposite lateral sides of the shaft 16, and a cover 22 pivotally attached to the side plates 18, 20. The side plates 18, 20 are each secured to the vertical wall 12 by mounting brackets 24. The side plates 18, 20 can be mounted to the vertical wall 12 in any conventional manner known in the art.

In the illustrated embodiment, the side plates 18, 20 have a pair of aligned, elongated pivot slots 26 formed in respective rear corner portions thereof. As will be discussed in more detail below, the pivot slots 26 allow generally linear movement of the cover 22 between a first pivoting position and a second linearly displaced pivoting position. Preferably, the pivot slots 26 angle upwardly from rear edges 28 of the side plates 18, 20 toward top edges 30 to direct such linear movement in a natural upward and forward direction toward an operator standing in the front of the shield assembly 10.

The cover 22 includes a top plate 32 extending between the side plates 18, 20 and a pair of side flanges 34, 35 depending downwardly from the top plate 32. The top plate 32 is positioned above the shaft 16 and the side flanges 34, 35 preferably angle downwardly toward the front of the shield assembly 10. To allow pivoting of the cover 22, a rear portion of the top plate 32 is rotatably attached to a horizontal pivot rod 36. Preferably, a pair of spaced sleeves 38 are welded to the rear portion of the top plate 32 for receiving the pivot rod 36, thus allowing the cover 22 to freely rotate about the pivot rod 36. The pivot rod 36 has opposing end portions 40 which extend laterally through the elongated pivot slots 26 in the side plates 18, 20.

Thus, the cover 22 is pivotable about the pivot rod 36 in a first pivoting position in which the pivot rod 36 bears against rear edges 42 of the pivot slots 26 as shown in FIGS. 6 and 7. The cover 22 is also pivotable about the pivot rod 36 in a second linearly displaced pivoting position in which the pivot rod 36 bears against forward edges 44 of the pivot slots 26 as shown in FIGS. 8 and 9. To move the cover 22 from the first pivoting position to the second pivoting position, the cover 22 is raised and merely pulled forwardly, thereby shifting the pivot rod 36 within the pivot slots 26. Although the pivot slots 26 are preferably configured to limit the linear movement of the pivot rod 36 and define the first and second pivoting positions, the pivot slots 26 can have any desired length such that the pivot rod 36 does not bear against forward and rear edges 44, 42 when pivoted in the first and second pivot positions.

As will be appreciated by those skilled in the art, various types of pivotal attachments can be employed to allow pivotal movement of the cover 22. For, example, the pivot rod 36 can be fixedly attached to the cover 22 such that the pivot rod 36 rotates with the cover 22 during pivotal movement. The pivot rod 36 can also be configured as separate, axially aligned hubs extending outwardly from the cover 22. In addition, the pivot rod can be mounted to the side flanges 34, 35 of the cover 22 rather than the top plate 32. Similarly, various types of attachments can be used to allow both pivotal and linear movement of the cover 22. For example, the end portions 40 of pivot rod 36 can be configured to slidably fit within channel members which extend inwardly from the side plates 18, 20. In addition, the pivot rod can be fixedly mounted to the side plates 18, 20 and extend through elongated pivot slots formed in the side flanges 34, 35 of the cover 22.

In a preferred form of the invention, the cover 22 is adjustable between a lowered and horizontal tilt position. The horizontal tilt position is the normal protective position of the cover during regular operation using standard implements. The lowered tilt position accommodates the pivotal lowering of the hitch 15 for connection to the implement linkage (not shown). To position the cover 22 in the lowered and horizontal tilt positions, a locating pin 46 is rigidly mounted to a forward portion of the top plate 32. The locating pin 46 is preferably welded to an underside of the top plate 32 and has opposing end portions which extend laterally outwardly from the top plate and beyond of the side plates 18, 20.

To position the cover 22 in the horizontal tilt position, a first pair of generally upright, aligned guide slots 48 are formed in the respective side plates 18 and 20. The guide slots 48 have a radius of curvature corresponding to the radial distance from the pivot rod 36 when the cover 22 is in the first pivoting position as shown in FIGS. 6 and 7. When the cover 22 is in the first pivoting position, the locating pin 46 and first pair of guide slots 48 are spaced approximately the same radial distance from the pivot rod 36. Thus, the locating pin 46 and first pair of guide slots 48 lie along the same arc of pivotal movement so that the cover 22 merely needs to be pivoted downwardly in order to engage the locating pin 46 with the first guide slots 48. The cover 22 is thereby placed in the horizontal position as shown in FIG. 6 when the locating pin 46 contacts lowermost edges 50 of the first guide slots 48.

To position the cover 22 in the lowered tilt position, a second pair of generally upright, aligned guide slots 52 are formed in the respective side plates 18 and 20. The second pair of guide slots 52 are spaced forwardly of the first pair of guide slots 48 in order to receive the locating pin 46 when the cover is in the second pivoting position. The second guide slots 52 also have a greater length such that lowermost edges 54 thereof are lower than the lowermost edges 50 of the first guide slots 48. The guide slots 52 have a radius of curvature corresponding to the radial distance from the pivot rod 36 when the cover 22 is in the second pivoting position as shown in FIGS. 8 and 9. When in the second pivoting position, the locating pin 46 and second pair of guide slots 52 are spaced approximately the same radial distance from the pivot rod 36. Thus, the locating pin 46 and second pair of guide slots 52 lie along the same arc of pivotal movement so that the cover 22 merely needs to be pivoted downwardly in order to engage the locating pin 46 with the second guide slots 52. The cover 22 is thereby placed in the lowered position as shown in FIG. 9 when the locating pin 46 contacts the lowermost edge 54 of the second guide slots 52.

Preferably, the first and second pairs of guide slots 48, 52 are open to the top edges 30 of the side plates 18, 20 to allow complete disengagement of the locating pin 46 therefrom, thus allowing the cover 22 to be raised a desired amount above the side plates 18 and 20. When the cover 22 is raised so that the locating pin 46 is completely disengaged from the guide slots, the cover 22 can be easily moved in a fore-aft direction between the first and second pivoting positions to place the locating pin 46 in position for pivotal engagement with a desired pair of guide slots. Preferably, upper corners 49, 53 of the guide slots 48, 52 are curved to act as cam surfaces which guide the locating pin 46 into the slots 48, 52. It will be appreciated that the guide slots 48, 52 can be configured as closed, continuous slots formed in the side plates 18, 20 such that disengagement of the locating pin 46 from the lowermost edges 50, 54 of the guide slots 52, 56 still allows easy manipulation of the cover 22.

While the configuration and arrangement of the locating pin 46 and the first and second pairs of guide slots 48, 52 are illustrated for purposes of disclosure, it is contemplated that many variations can be made within the scope of the present invention. One such variation would be to provide releasable hooks, catches or other types of stops on the side plates 18, 20 instead of the guide slots 48, 52. The positions of the guide slots 48, 52 relative to the locating pin 46 could also be reversed. For example, the guide slots 48, 52 can be formed in an inverted manner on the side flanges 32, 34 of the cover 22 for cooperation with a locating pin extending inwardly from each side plate 18, 20. In addition, two axially spaced locating pins can be provided on the side flanges 32, 34 of the cover 22 for cooperation with a single aligned pair of guide slots formed on the side plates 18, 20. A single pair of aligned guide slots could also be formed on the side flanges 32, 34 of the cover 22 for cooperation with axially spaced locating pins extending inwardly from each side plate 18, 20. And, obviously, the cooperating guide slot(s) and locating pin(s) need only be formed on one of the side plates 18, 20 and the associated side flange 32, 34 of the cover 22.

Preferably, a locking mechanism is also provided to secure the cover 22 in the lowered and horizontal tilt positions, and also to secure the cover 22 in a raised tilt position. The top plate 32 of the cover 22 angles upwardly in the raised tilt position to provide access to the PTO shaft 16 for attachment and detachment of an implement. The locking mechanism includes a locking pin 56 extending laterally outwardly from the side flange 35 of the cover 22 toward the side plate 20 of the shield assembly 10. The side plate 20 has vertically spaced apertures 58, 60, and 62 formed thereon for selectively receiving the locking pin 56 to lock the cover 22 in the respective lowered, horizontal, and raised tilt positions. In the raised tilt position, the locating pin 46 is completely disengaged from the guide slots 48, 52 as shown in FIG. 7.

In order to engage and disengage the locking pin 56 from a selected one of the apertures 58, 60 and 62, the cover 22 is laterally movable between the side plates 18 and 20. Preferably, the cover 22 has a width less than the distance between the side plates 18 and 20 to allow such lateral movement. A spring 64 is also interposed between the side plate 18 and the cover 22 in order to bias the cover 22 toward the side plate 20. Preferably, the spring 64 is disposed on the pivot rod 36 between the side plate 18 and the adjacent sleeve 38 of the cover 22. Thus, the spring 64 acts against the sleeve 38 to bias the cover 22 toward the side plate 20 and maintain the locking pin 56 within a selected one of the apertures 58, 60 and 62. To disengage the locking pin 56 from the apertures and allow pivotal movement of the cover 22, the cover 22 is forced toward the side plate 18 against the action of the spring 64. The spring 64 also provides the further advantage of inhibiting rattling of the cover 22 when the tractor is moving.

Figure 3:
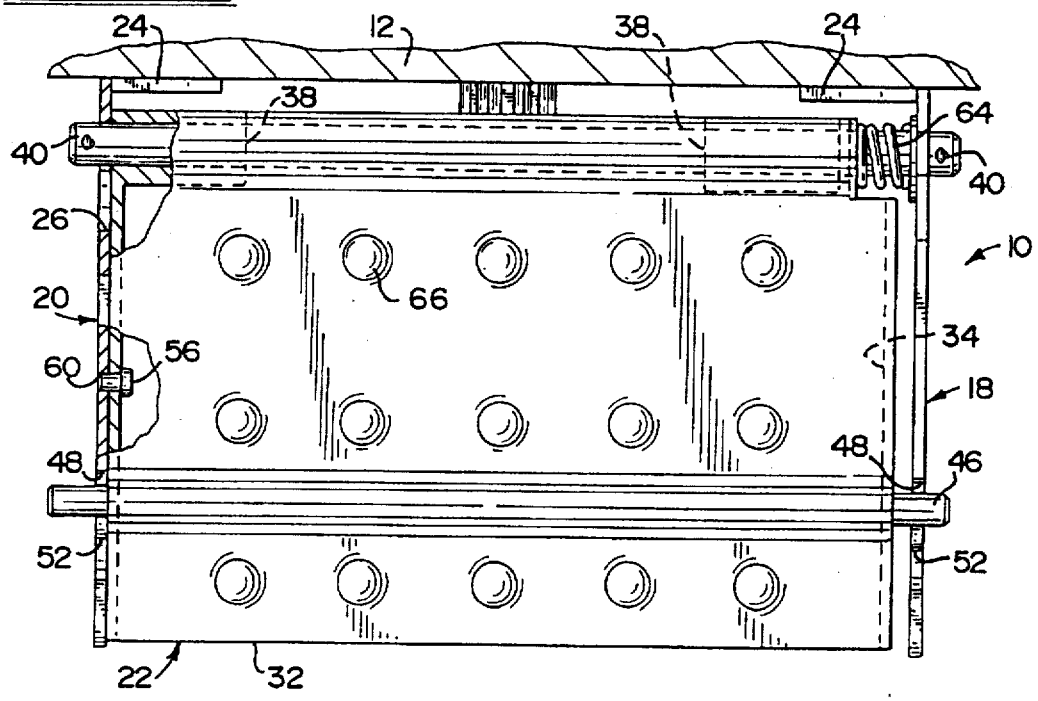
FIG. 3 is a top plan view of the shield assembly shown in FIG. 2.
Figure 4:
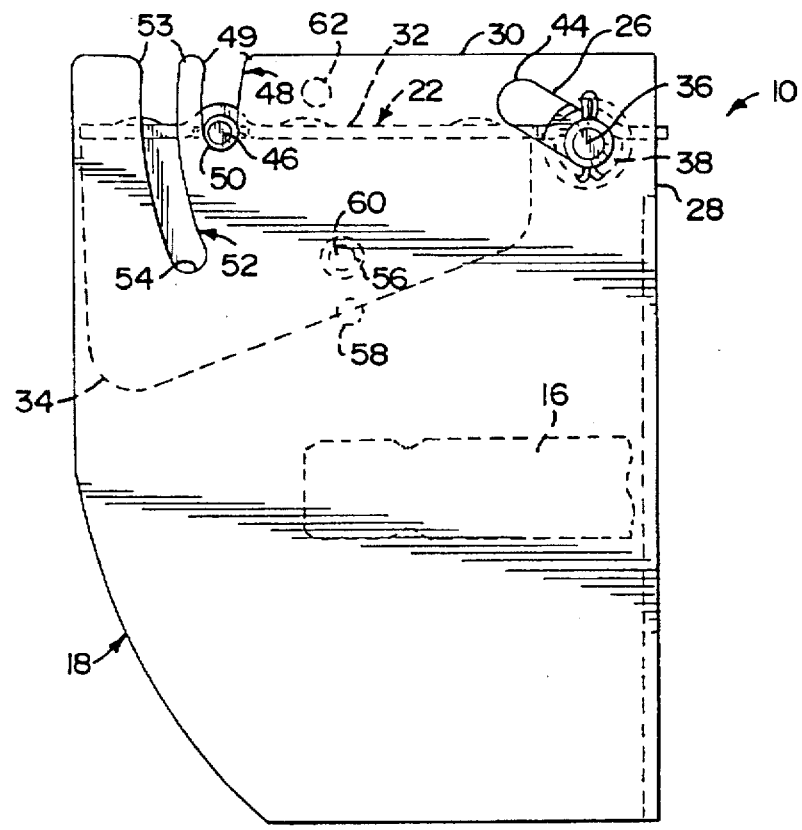
FIG. 4 is a right side elevation view of the shield assembly shown in FIG. 2.

The operation of the foregoing preferred embodiment of the invention will now be described with particular reference to FIGS. 3 and 5–9. Referring to FIGS. 3 and 6, the cover 22 is initially in the horizontal tilt position. In this tilt position, the cover 22 is in the first pivoting position in which the pivot rod 36 bears against the rear edges 42 of the pivot slots 26, thereby placing the first guide slots 48 and the locating pin 46 at the same radial distance from the pivot rod 36. The locating pin 46 is resting against the lowermost edges 50 of the first guide slots 48 and the spring 64 is forcing the cover 22 against the side plate 20 to maintain the locking pin 56 in operable engagement with the aperture 60.

Figure 5:
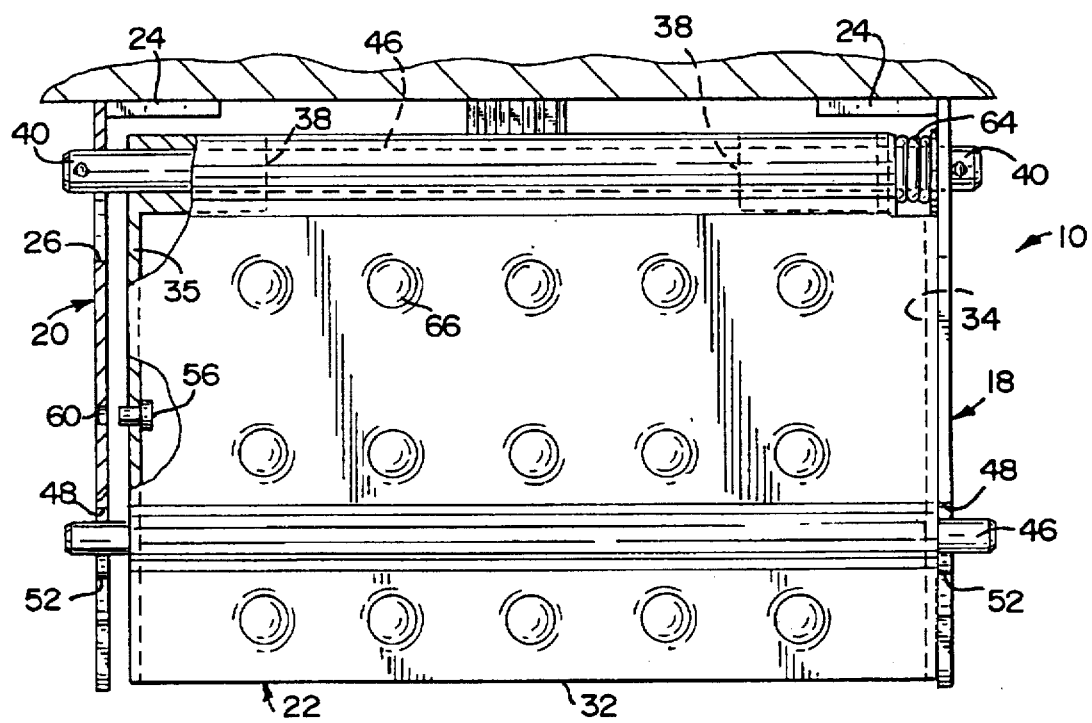
FIG. 5 is a top plan view of the shield assembly showing a cover moved laterally against a side plate.

To adjust the tilt position of the cover 22, an operator forces the cover 22 laterally toward the side plate 34 against the action of the spring 64 as shown in FIG. 5. This disengages the locking pin 56 from the aperture 60 and allows pivotal movement of the cover 22. The cover 22 is then pivoted upwardly while in the first pivoting position to completely disengage the locating pin 46 from the first guide slots 48. If it is desired to maintain the cover 22 in the raised tilt position, the cover 22 is raised until the locking pin 56 is in alignment with the aperture 62 in the side plate 20 as shown in FIG. 7. The cover 22 is then released and the spring 64 forces the locking pin 56 into engagement with the uppermost aperture 62, thereby locking the cover 22 in the raised position.

If it is desired to move the cover 22 directly from the horizontal position to the lowered position, the locking pin 56 is not placed in alignment with the aperture 62. Instead, the cover 22 is pulled in the direction of the arrow shown in FIG. 8 from the first pivoting position to the second pivoting position. In practice, the cover 22 can be raised past the aperture 62 and then moved forwardly, or simultaneously lifted and moved forwardly to so that the locking pin 56 does not inadvertently engage the aperture 62. In the second pivoting position, the pivot rod 36 bears against the front edges 44 of the pivot slots 26, thereby placing the second guide slot 52 and the locating pin 46 at the same radial distance from the pivot rod 36.

To place the cover 22 in the lowered tilt position, the cover 22 is pivoted downwardly until the locating pin 46 engages the lowermost edge 54 of the second guide slots 52 as shown in FIG. 9. The cover 22 is then released and the spring 64 forces the locking pin 56 into engagement with the lowermost aperture 58, thereby locking the cover 22 in the lowered position.

The components of the shield assembly 10 are of sufficient strength such that a tractor operator may stand on top of the top plate 32. To this end, the top plate 32 has holes 66 which provide traction edges to avoid slipping when the top plate 32 is used for this purpose. The shield assembly 10 is preferably made using steel plating and components, or other readily available materials and parts.

Thus, a shield assembly is provided which is easily adjustable and securely maintained in a lowered, horizontal, and raised tilt position to facilitate access to the power take-off shaft and hitch of a tractor.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A shield assembly for a power take-off shaft protruding from a tractor, comprising:

first and second generally vertical, laterally spaced side plates positioned on opposite lateral sides of the shaft;

a cover cooperating with the side plates and positioned above the shaft, said cover being pivotable about a horizontal pivot axis and movable in a generally linear direction between a first pivoting position and a linearly displaced second pivoting position;

a positioning member disposed on one of the cover and the first side plate; and first and second stops disposed on the other of said cover and said first side plate, the first stop and the positioning member being in general vertical alignment when the cover is in the first pivoting position, and the second stop and the positioning member being in general vertical alignment when the cover is in the linearly displaced second pivoting position, and said first stop and second stop being positioned at different elevations so that a first tilt position of the cover is at a different angle than a second tilt position of the cover;

whereby the cover is pivotable in the first pivoting position from the first tilt position in which the positioning member and first stop are in operable engagement, to a raised position in which the positioning member is disengaged from said first stop, whereupon the cover is movable in said linear direction to the linearly displaced second pivoting position to place the positioning member and the second stop in general vertical alignment, wherein the cover is pivotable to the second tilt position in which the positioning member and second stop are in operable engagement.

2. The shield assembly of claim 1 wherein the horizontal pivot axis is defined by a horizontal pivot rod mounted to one of said cover and said first and second side plates, and wherein end portions of said pivot rod extend laterally through a pair of aligned, elongated pivot slots formed in the other of said cover and first and second side plates, whereby the cover is pivotable about the axis of the pivot rod and movable in said linear direction defined by said elongated pivot slots.

3. The shield assembly of claim 2 wherein the pivot rod is mounted to the cover and the elongated pivot slots are formed on the respective side plates, said pivot slots angling upwardly from rear edges of the side plates toward top edges of the side plates.

4. The shield assembly of claim 1 wherein the positioning member comprises a locating pin rigidly secured to said cover and extending laterally outwardly therefrom.

5. The shield assembly of claim 4 wherein the first stop comprises a lower edge of a generally upright first guide slot formed in the first side plate, and the second stop comprises a lower edge of a generally upright second guide slot formed in the first side plate, said first and second guide slots being spaced apart and each of said first and second guide slots having a radius of curvature corresponding to the distance from said horizontal pivot axis when the cover is in the respective first and second pivoting positions.

6. The shield assembly of claim 5 wherein the first and second guide slots are open to the top edge of the side plate to allow complete disengagement of the locating pin therefrom, thus allowing the cover to be raised a desired amount above the side plates.

7. The shield assembly of claim 5 wherein the lower edge of the first guide slot is at a higher elevation than the lower edge of the second guide slot, whereby the cover is generally horizontal in the first tilt position when said locating pin engages said first guide slot lower edge, and the cover is lowered in the second tilt position when said locating pin engages said second guide slot lower edge.

8. The shield assembly of claim 1 further comprising a locking mechanism disposed on the cover and one of the first and second side plates, said locking mechanism adapted to secure the cover in said first and second tilt positions.

9. The shield assembly of claim 8 wherein the locking mechanism comprises a locking pin extending laterally outwardly from the cover, and first and second apertures formed on an adjacent one of the first and second side plates for receiving said locking pin when the cover is in the respective first and second tilt positions, said cover having a width less than the distance between the side plates to allow the cover to be moved laterally away from said apertures in order to disengage the locking pin therefrom and allow pivotal movement of said cover.

10. The shield assembly of claim 9 wherein the cover comprises a top plate and side flanges depending downwardly therefrom, said locking pin extending laterally outwardly from one of said side flanges adjacent said first and second apertures.

11. The shield assembly of claim 10 wherein the first and second apertures are oriented such that the top plate is generally horizontal in the first tilt position and lowered below a horizontal plane in the second tilt position, and further comprising a third aperture positioned above the first and second apertures to allow the top plate to be releasably secured in a third tilt position raised above a generally horizontal plane to enhance access to said shaft.

12. The shield assembly of claim 11 wherein the cover is biased laterally toward the side plate with the first and second apertures to retain the locking pin in a selected one of said first and second apertures.

13. The shield assembly of claim 1 wherein the cover is biased toward one of the first and second side plates to inhibit rattling of said cover while the tractor is moving.

14. The apparatus of claim 1 wherein said side plates are fixedly mounted to the tractor and positioned directly opposite lateral sides of the shafts, said side plates having at least a height corresponding to the diameter of the shaft to completely shield lateral access to the shaft.

15. A shield assembly for a power take-off shaft protruding from a tractor, comprising:

a pair of generally vertical, laterally spaced side plates adapted to be positioned on opposite lateral sides of the shaft, said side plates having a pair of aligned, elongated pivot slots formed in respective upper corner potions thereof adjacent the tractor;

a cover positioned above the shaft, said cover having a horizontal pivot rod mounted to a rear edge portion thereof with opposing end portions extending laterally through said elongated pivot slots, whereby said cover is pivotable about the axis of the pivot rod and movable with said pivot rod in a generally linear direction defined by said elongated pivot slots between a first pivoting position and a linearly displaced second pivoting position;

a locating pin extending laterally outwardly from said cover;

a first guide slot formed in one of the side plates, said first guide slot having a radius of curvature corresponding to the radial distance from said pivot rod when the cover is in the first pivoting position, said locating pin and first guide slot being spaced approximately the same radial distance from the pivot rod when the cover is in said first pivoting position; and a second guide slot formed in one of the side plates, said second guide slot having a radius of curvature corresponding to the radial distance from said pivot rod when the cover is in the linearly displaced second pivoting position, said locating pin and second guide slot being spaced approximately the same radial distance from the pivot rod when the pivot rod is in said linearly displaced second pivoting position, and said second guide slot having a greater length than said first guide slot such that a lowermost edge of the second guide slot is lower than a lowermost edge of the first guide slot; and whereby the cover is pivotable in the first pivoting position from the first tilt position in which the locating pin and a lowermost edge of the first guide slot are in operable engagement to a raised position in which the locating pin is disengaged from said first guide slot lowermost edge, whereupon the cover is movable in said linear direction to the linearly displaced second pivoting position to place the locating pin and the second slot along the same radius of curvature relative to said pivot rod, wherein the cover is pivotable to the second tilt position in which the locating pin and a lowermost edge of the second slot are in operable engagement.

16. The shield assembly of claim 15 wherein the elongated pivot slots angle upwardly from vertical edges of the side plates adjacent the tractor toward top edges of the side plates.

17. The shield assembly of claim 15 wherein the locating pin is rigidly secured to said cover.

18. The shield assembly of claim 17 wherein the cover is generally horizontal in the first tilt position when said locating pin engages said first guide slot lowermost edge, lowered in the second tilt position when said locating pin engages said second guide slot lowermost edge, and raised above a generally horizontal plane in said first and second pivoting positions.

19. The shield assembly of claim 18 further comprising a locking mechanism disposed on the cover and one of the side plates, said locking mechanism adapted to releasably secure the cover in said first and second tilt positions and a third tilt position raised above a horizontal plane.

20. The shield assembly of claim 19 wherein the locking mechanism comprises a locking pin extending laterally outwardly from the cover, and first, second, and third apertures formed on an adjacent one of the side plates for receiving said locking pin when the cover is in the respective first, second, and third tilt positions, said cover having a width less than the distance between the side plates to allow the cover to be moved laterally away from said adjacent one of the side plates in order to disengage the locking pin therefrom and allow pivotal movement of said cover between said first, second, and third tilt positions.

21. The shield assembly of claim 20 wherein the cover comprises a top plate and side flanges depending downwardly therefrom, said locking pin extending laterally from one of said side flanges toward and adjacent said first, second, and third apertures.

22. The shield assembly of claim 20 wherein the cover is biased laterally toward said adjacent one of the side plates to retain the locking pin in a selected one of said first, second, and third apertures.

23. The shield assembly of claim 15 wherein the cover is biased toward one of the first and second side plates to inhibit rattling of said cover while the tractor is moving.

24. A shield assembly for a power take-off shaft protruding from a tractor, comprising:

a pair of generally vertical, spaced side plates adapted to be positioned on opposite sides of the shaft, said side plates having a pair of aligned, elongated pivot slots formed in respective upper corner portions thereof adjacent the tractor which angle upwardly from vertical edges of the side plates adjacent the tractor toward top edges of the side plates, and one of said side plates having vertically spaced first, second, and third apertures formed therein;

a cover including a top plate and a pair of side flanges extending downwardly from said top plate, the top plate adapted to be positioned above the shaft and having a width less than the distance between the side plates, said cover having a horizontal pivot rod mounted to a rear portion thereof with opposing end portions extending laterally through said elongated pivot slots, whereby said cover is pivotable about the axis of the pivot rod between a lowered position, horizontal position and raised position, and movable with said pivot rod in a generally linear direction defined by said elongated pivot slots between a first pivoting position and a linearly displaced second pivoting position;

a locating pin rigidly mounted to a forward portion of said cover and extending laterally outwardly therefrom;

a first guide slot formed in one of the side plates, said first guide slot having a radius of curvature corresponding to the radial distance from said pivot rod when the cover is in the first pivoting position, said locating pin and first guide slot being spaced approximately the same radial distance from the pivot rod when the pivot rod is in said first pivoting position; and a second guide slot formed in one of the side plates, said second guide slot having a radius of curvature corresponding to the radial distance from said pivot rod when the cover is in the linearly displaced second pivoting position, said locating pin and second guide slot being spaced approximately the same radial distance from the pivot rod when the pivot rod is in said linearly displaced second pivoting position, and said second guide slot having a greater length than said first guide slot such that a lowermost edge thereof is lower than a lowermost edge of the first guide slot;

a locking pin extending laterally outwardly from one of said side flanges adjacent the first, second, and third apertures, said first, second, and third apertures selectively receiving said locking pin when the cover is in a respective lowered position, horizontal position, and raised position; and a spring disposed on said pivot rod to bias the cover laterally toward the side plate with said apertures in order to retain the locking pin in a selected one of said first, second, and third apertures;

wherein the cover is moved in a lateral direction against the force of the spring to disengage the locking pin from a selected one of the first, second, and third apertures in the side plate, thus allowing the cover to pivot between said lowered, horizontal, and raised positions, and wherein the cover is pivotable in the first pivoting position from the horizontal position in which the locking pin and the lowermost edge of the first guide slot are in operable engagement to a raised position in which the locating pin is generally above and disengaged from said first guide slot, and wherein the cover is movable in said linear direction from the first pivoting position to the linearly displaced second pivoting position to place the locating pin and the lowermost edge of the second guide slot along the same general radius of curvature relative to said pivot rod, and wherein the cover is pivotable in said linearly displaced second pivoting position to the lowered position in which the locating pin and the lowermost edge of the second guide slot are in operable engagement.

25. A shield assembly for a power take-off shaft protruding from a tractor, comprising:

first and second generally vertical, spaced side plates positioned on opposite sides of the shaft;

a cover positioned above the shaft and configured to move in a lateral direction between said side plates; and a biasing member adapted to act against the cover to force said cover toward the second side plate to inhibit rattling of said cover when the tractor is moving.

26. The shield assembly of claim 25 wherein the biasing member comprises a compression spring interposed between the cover and said first side plate.

27. The shield assembly of claim 26 wherein the cover is pivotally attached to the side plates by a pivot rod and said spring is disposed around a portion of said pivot rod.

28. The shield assembly of claim 25 wherein the cover is pivotally attached to the side plate members, and further comprising a locking pin extending laterally outwardly from the cover toward said second side plate, and a first aperture formed on the second side plate for receiving said locking pin, whereby the cover is pivotable to a generally horizontal tilt position in which the locking pin is in alignment with said first aperture and the biasing member acts against the cover to force the locking pin into locking engagement with said first aperture.

29. The shield assembly of claim 28 further comprising a second aperture formed on the second side plate below said first aperture for receiving the locking pin when the cover is pivoted to a lowered tilt position, whereby the cover is pivotable to a desired one of said horizontal and lowered tilt positions to align said locking pin with the associated one of said first and second apertures, said cover being movable away from the second side plate against the action of the biasing member to disengage the locking pin and allow pivotal movement thereof between said horizontal and lowered tilt positions.

30. The shield assembly of claim 29 wherein the cover comprise a top plate and first and second side flanges extending downwardly therefrom, the first side flange being adjacent the first side plate and the second side flange being adjacent the second side plate, and wherein the locking pin extends outwardly from the second side flange toward the second side plate, further comprising a third aperture formed on the second side plate above said first aperture for receiving the locking pin when the cover is pivoted to a raised tilt position, whereby the cover is pivotable to a desired one of said lowered, horizontal, and raised tilt positions to align said locking pin with the associated one of said first, second, and third apertures, said cover being movable away from the first side plate against the action of the biasing member to disengage the locking pin and allow pivotal movement thereof between said horizontal, lowered, and raised tilt positions.

31. The apparatus of claim 25 wherein said cover has a width less than the distance between said side plates to allow movement of said cover in a lateral direction between said side plates.

32. In combination with a tractor having a fore-and-aft extending frame with a rotatable power take-off shaft projecting rearwardly from said frame, a shield assembly for said power take off shaft, comprising:

first and second spaced, parallel, vertical plates fastened to and extending from said frame on opposite lateral sides of the shaft to inhibit access to said shaft;

a cover extending between vertical planes defined by said plates and generally horizontally above said shaft, said cover being pivotally movable relative to said plates, between at least two different angular displaced tilt positions relative to said shaft; and a spring-biased locking mechanism for releasably holding said cover in either of said two different angular displaced tilt positions relative to said shaft.

33. The shield assembly of claim 32 wherein the locking mechanism comprises a locking pin extending laterally outwardly from said cover toward said second plate, said second plate having first and second apertures formed thereon in locations corresponding to said first and second angular displaced positions of the cover, and a spring adapted to act against the cover to force said cover toward said second plate and force the locking pin into selective releasable engagement with a desired one of said first and second apertures.

34. The shield assembly of claim 33 wherein the cover comprises a top plate and first and second side flanges extending downwardly therefrom, the first side flange being adjacent the first plate and the second side flange being adjacent the second plate, and wherein the locking pin extends outwardly from the second side flange toward the second side plate, further comprising a third aperture formed on the second side plate above said first aperture for receiving the locking pin when the cover is pivoted to a third angular displaced position raised above a generally horizontal plane.

35. In combination with a tractor having a fore-and-aft extending frame with a rotatable power take-off shaft projecting rearwardly from said frame, a guard assembly for said power take off shaft, comprising:

a shield including a pair of vertical and generally parallel laterally spaced plates adapted to be secured to the frame of the tractor to inhibit access to the shaft from opposite sides of the shaft;

a cover attached to the plates above the shaft, said cover being pivotable about a generally horizontal pivot axis and movable in a generally fore-and-aft direction;

a positioning assembly carried by said shield and cover and comprised of a positioning member arranged in combination with first and second stops for selectively allowing said cover to be moved and positioned in first and second tilt positions relative to said shaft, whereby the tilted position of the cover is selectively adjustable by initially pivoting the cover upwardly from said first tilt position in which the positioning member operably engages the first stop, to a position wherein the positioning member and first and second stops are released from operable association with each other to allow for fore-aft movement of the cover, said fore-aft movement placing the positioning member and second stop along the same radius of curvature relative to said horizontal pivot axis to allow subsequent pivotal movement of said cover to the second tilt position in which the positioning member engages the second stop.

36. In combination with a tractor having a fore-and-aft extending frame with a rotatable power take-off shaft projecting rearwardly from said frame, a shield assembly for said power take off shaft, comprising:

first and second generally parallel, vertical side plates fastened to and extending from said frame on opposite lateral sides of the shaft to inhibit access to said shaft;

a cover including a top plate extending between the side plates and first and second side flanges depending downwardly from said top plate, the top plate having a width less than the distance between the side plates to allow the cover to move in a lateral direction between said side plates, the first side flange being adjacent the first side plate and the second side flange being adjacent the second side plate, said cover being pivotally mounted to the side plates to allow pivotal movement about a horizontal pivot axis between a horizontal tilt position, a lowered tilt position, and a raised tilt position;

a biasing member adapted to act against the cover to force said cover toward said second side plate;

a locking pin extending laterally outwardly from the the second side flange toward the second side plate;

a first aperture formed on the second side plate for receiving said locking pin when the cover is pivoted to the horizontal tilt position;

a second aperture formed on the second side plate below said first aperture for receiving the locking pin when the cover is pivoted to the lowered tilt position; and a third aperture formed on the second side plate above said first aperture for receiving the locking pin when the cover is pivoted to the raised tilt position;

whereby the cover is pivotable to a desired one of said horizontal, lowered, and raised tilt positions to align said locking pin with the associated one of said first, second, and third apertures, wherein the biasing member acts against the cover to force the locking pin into locking engagement with the associated aperture , and wherein said cover is movable away from the second side plate against the action of the biasing member to disengage the locking pin and allow pivotal movement thereof between said horizontal, lowered, and raised tilt positions.

* * * * *